(12) United States Patent
Kamath et al.

(10) Patent No.: US 11,030,253 B2
(45) Date of Patent: Jun. 8, 2021

(54) MANAGING DATA FEEDS FROM DIFFERENT APPLICATIONS FOR USERS

(71) Applicant: SAP SE, Walldorf (DE)

(72) Inventors: Shashidhar Kamath, Palo Alto, CA (US); Rahul Sule, Palo Alto, CA (US); Prashant Bhagat, Cupertino, CA (US); Manav Sharma, Palo Alto, CA (US); Rajendra Vuppala, Dublin, CA (US); Aarathi Vidyasagar, Cupertino, CA (US); Sudhir Bhojwani, Mountain View, CA (US)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 16/214,958

(22) Filed: Dec. 10, 2018

(65) Prior Publication Data
US 2019/0272295 A1 Sep. 5, 2019

Related U.S. Application Data

(60) Provisional application No. 62/637,753, filed on Mar. 2, 2018.

(51) Int. Cl.
*G06F 16/903* (2019.01)
*G06N 20/00* (2019.01)
*G06Q 30/06* (2012.01)

(52) U.S. Cl.
CPC ....... *G06F 16/90335* (2019.01); *G06N 20/00* (2019.01); *G06Q 30/0635* (2013.01)

(58) Field of Classification Search
CPC ............. G06F 16/958; G06F 15/17306; G06F 16/24578; G06F 16/9577; G06F 16/38; G06F 16/90335; G06Q 50/01; G06Q 10/06393; G06Q 10/0635; G06N 20/00
See application file for complete search history.

(56) References Cited

U.S. PATENT DOCUMENTS

| | | | |
|---|---|---|---|
| 8,768,863 B2* | 7/2014 | Gubin | G06Q 10/06393 706/12 |
| 2011/0179020 A1* | 7/2011 | Ozzie | G06F 16/958 707/723 |
| 2012/0316916 A1* | 12/2012 | Andrews | G06Q 10/0635 705/7.28 |
| 2013/0018955 A1* | 1/2013 | Thaxton | G06F 16/958 709/204 |

(Continued)

*Primary Examiner* — Etienne P Leroux
(74) *Attorney, Agent, or Firm* — Fountainhead Law Group P.C.

(57) ABSTRACT

Some embodiments provide a program that receives from a client device a request for data feed items relevant to a user, determines a set of categories associated with the user, and queries a database for a first set of data feed items specify the user as a recipient of the data feed item. The program retrieves a second set of data feed items from an external content provider. The program modifies relevance scores of the first set of data feed items and the second set of data feed items based on the set of categories associated with the user and a set of factors, generates a result set of data feed items comprising the first and second sets of data feed items ordered based on the modified relevancy scores from highest relevancy score to lowest relevancy score, and provides the result set of data feed items to the client device.

20 Claims, 8 Drawing Sheets

(56) References Cited

U.S. PATENT DOCUMENTS

| | | | |
|---|---|---|---|
| 2013/0031034 A1* | 1/2013 | Gubin | G06Q 50/01 706/12 |
| 2013/0246440 A1* | 9/2013 | Tareen | G06F 16/38 707/749 |
| 2013/0262476 A1* | 10/2013 | Barak | G06F 16/9577 707/748 |
| 2014/0258191 A1* | 9/2014 | Gubin | G06N 20/00 706/12 |
| 2016/0196267 A1* | 7/2016 | Hansen | G06F 16/24578 707/749 |
| 2016/0239918 A1* | 8/2016 | Lambur | G06Q 50/01 |
| 2016/0349938 A1* | 12/2016 | Sharon | G06F 15/17306 |
| 2018/0276561 A1* | 9/2018 | Pasternack | G06N 20/00 |
| 2019/0258741 A1* | 8/2019 | Chen | G06F 16/24578 |

* cited by examiner

MANAGING DATA FEEDS FROM DIFFERENT APPLICATIONS FOR USERS

CROSS-REFERENCE TO RELATED APPLICATION

The present application claims the benefit and priority of U.S. Provisional Application No. 62/637,753, filed Mar. 2, 2018, entitled "Ariba Wall," the entire contents of which are incorporated herein by reference in its entirety for all purposes.

BACKGROUND

Procurement and sourcing are functions that are utilized by many companies and businesses in order to acquire goods and/or services. Some companies or businesses may outsource such functions to a third-party. Other companies or businesses have an internal team of employees that perform procurement and sourcing functions. Such third-parties or internal teams of employees may use a variety of different tools and/or services to perform procurement and sourcing functions. For example, some tools and/or services can include one or more of the following features: selecting suppliers, onboarding suppliers, communicating with suppliers, creating purchase orders, approving purchase orders, tracking the status of purchase orders, managing inventory, managing finances (e.g., billing, payment of goods and/or services, etc.), managing documents, managing budgets, generating reports, etc.

SUMMARY

In some embodiments, a non-transitory machine-readable medium stores a program. The program receives from a client device a request for data feed items relevant to a user. The program further determines a set of categories associated with the user. The program also queries a database for a first set of data feed items specify the user as a recipient of the data feed item. The database is configured to store data feed items received from a plurality of applications. Each data feed item received from an application in the plurality of applications includes a type of the data feed item, a set of categories associated with the data feed item, a relevancy score, and a set of recipients of the data feed item. The program further retrieves a second set of data feed items from an external content provider comprising data feed items associated with at least a category in the set of categories. Each data feed item in the second set of data feed items includes a relevancy score. The program also modifies the relevance scores of the first set of data feed items and the second set of data feed items based on the set of categories associated with the user and a set of factors. The program further generates a result set of data feed items comprising the first and second sets of data feed items ordered based on the modified relevancy scores from highest relevancy score to lowest relevancy score. The program also provides the result set of data feed items to the client device.

In some embodiments, modifying the relevance scores of the first set of data feed items and the second set of data feed items based on the set of categories associated with the user and a set of factors may include increasing the relevancy scores of data feed items in the first set of data feed items having a particular type of data feed item and maintaining the relevancy scores of data feed items in the first set of data feed items having a type of data feed item other than the particular type of data feed item. The second set of data feed items from the external content provider may further include data feed items associated with categories other than the set of categories. Modifying the relevance scores of the first set of data feed items and the second set of data feed items based on the set of categories associated with the user and a set of factors may include increasing the relevancy scores of data feed items in the second set of data feed items associated with at least a category in the set of categories and maintaining the relevancy scores of data feed items in the second set of data feed items associated categories other than the set of categories.

In some embodiments, each data feed item in the first and second sets of data feed items may include a timestamp. Modifying the relevance scores of the first set of data feed items and the second set of data feed items based on the set of categories associated with the user and a set of factors may include increasing the relevancy scores of data feed items in the first and second sets of set of data feed items having a more recent timestamp by a larger amount than data feed items in the first and second sets of set of data feed items having a less recent timestamp. Modifying the relevance scores of the first set of data feed items and the second set of data feed items based on the set of categories associated with the user and a set of factors may include increasing the relevancy scores of data feed items in the first and second sets of set of data feed items that have not been viewed the user.

In some embodiments, retrieving the second set of data feed items from the external content provider may include sending the external content provider a request for data feed items, receiving the second set of data feed items from the external content provider, and, for each data feed item in the second set of data feed items, using a classifier model to determine a set of categories associated with the data feed item and to determine the relevancy score of the data feed item based on the determined set of categories associated with the user and the determined set of categories associated the data feed item. Determining the set of categories associated with the user may include using a classifier model configured to determine sets of categories for users in order to determine the set of categories associated with the user.

In some embodiments, a method, executable by a device, receives from a client device a request for data feed items relevant to a user. The method further determines a set of categories associated with the user. The method also queries a database for a first set of data feed items specify the user as a recipient of the data feed item. The database is configured to store data feed items received from a plurality of applications. Each data feed item received from an application in the plurality of applications includes a type of the data feed item, a set of categories associated with the data feed item, a relevancy score, and a set of recipients of the data feed item. The method further retrieves a second set of data feed items from an external content provider comprising data feed items associated with at least a category in the set of categories. Each data feed item in the second set of data feed items includes a relevancy score. The method also modifies the relevance scores of the first set of data feed items and the second set of data feed items based on the set of categories associated with the user and a set of factors. The method further generates a result set of data feed items comprising the first and second sets of data feed items ordered based on the modified relevancy scores from highest relevancy score to lowest relevancy score. The method also provides the result set of data feed items to the client device.

In some embodiments, modifying the relevance scores of the first set of data feed items and the second set of data feed items based on the set of categories associated with the user and a set of factors may include increasing the relevancy scores of data feed items in the first set of data feed items having a particular type of data feed item and maintaining the relevancy scores of data feed items in the first set of data feed items having a type of data feed item other than the particular type of data feed item. The second set of data feed items from the external content provider may further include data feed items associated with categories other than the set of categories. Modifying the relevance scores of the first set of data feed items and the second set of data feed items based on the set of categories associated with the user and a set of factors may include increasing the relevancy scores of data feed items in the second set of data feed items associated with at least a category in the set of categories and maintaining the relevancy scores of data feed items in the second set of data feed items associated categories other than the set of categories.

Each data feed item in the first and second sets of data feed items may include a timestamp. Modifying the relevance scores of the first set of data feed items and the second set of data feed items based on the set of categories associated with the user and a set of factors may include increasing the relevancy scores of data feed items in the first and second sets of set of data feed items having a more recent timestamp by a larger amount than data feed items in the first and second sets of set of data feed items having a less recent timestamp. Modifying the relevance scores of the first set of data feed items and the second set of data feed items based on the set of categories associated with the user and a set of factors may include increasing the relevancy scores of data feed items in the first and second sets of set of data feed items that have not been viewed the user.

In some embodiments, retrieving the second set of data feed items from the external content provider may include sending the external content provider a request for data feed items, receiving the second set of data feed items from the external content provider, and, for each data feed item in the second set of data feed items, using a classifier model to determine a set of categories associated with the data feed item and to determine the relevancy score of the data feed item based on the determined set of categories associated with the user and the determined set of categories associated the data feed item. Determining the set of categories associated with the user may include using a classifier model configured to determine sets of categories for users in order to determine the set of categories associated with the user.

In some embodiments, a system includes a set of processing units and a non-transitory machine-readable medium that stores instructions. The instructions cause at least one processing unit to receive from a client device a request for data feed items relevant to a user. The instructions further cause the at least one processing unit to determine a set of categories associated with the user. The instructions also cause the at least one processing unit to query a database for a first set of data feed items specify the user as a recipient of the data feed item. The database is configured to store data feed items received from a plurality of applications. Each data feed item received from an application in the plurality of applications includes a type of the data feed item, a set of categories associated with the data feed item, a relevancy score, and a set of recipients of the data feed item. The instructions further cause the at least one processing unit to retrieve a second set of data feed items from an external content provider comprising data feed items associated with at least a category in the set of categories. Each data feed item in the second set of data feed items includes a relevancy score. The instructions also cause the at least one processing unit to modify the relevance scores of the first set of data feed items and the second set of data feed items based on the set of categories associated with the user and a set of factors. The instructions further cause the at least one processing unit to generate a result set of data feed items comprising the first and second sets of data feed items ordered based on the modified relevancy scores from highest relevancy score to lowest relevancy score. The instructions also cause the at least one processing unit to provide the result set of data feed items to the client device.

In some embodiments, modifying the relevance scores of the first set of data feed items and the second set of data feed items based on the set of categories associated with the user and a set of factors may include increasing the relevancy scores of data feed items in the first set of data feed items having a particular type of data feed item and maintaining the relevancy scores of data feed items in the first set of data feed items having a type of data feed item other than the particular type of data feed item. The second set of data feed items from the external content provider may further include data feed items associated with categories other than the set of categories. Modifying the relevance scores of the first set of data feed items and the second set of data feed items based on the set of categories associated with the user and a set of factors may include increasing the relevancy scores of data feed items in the second set of data feed items associated with at least a category in the set of categories and maintaining the relevancy scores of data feed items in the second set of data feed items associated categories other than the set of categories.

In some embodiments, each data feed item in the first and second sets of data feed items may include a timestamp. Modifying the relevance scores of the first set of data feed items and the second set of data feed items based on the set of categories associated with the user and a set of factors may include increasing the relevancy scores of data feed items in the first and second sets of set of data feed items having a more recent timestamp by a larger amount than data feed items in the first and second sets of set of data feed items having a less recent timestamp. Modifying the relevance scores of the first set of data feed items and the second set of data feed items based on the set of categories associated with the user and a set of factors may include increasing the relevancy scores of data feed items in the first and second sets of set of data feed items that have not been viewed the user. Retrieving the second set of data feed items from the external content provider may include sending the external content provider a request for data feed items, receiving the second set of data feed items from the external content provider, and, for each data feed item in the second set of data feed items, using a classifier model to determine a set of categories associated with the data feed item and to determine the relevancy score of the data feed item based on the determined set of categories associated with the user and the determined set of categories associated the data feed item.

The following detailed description and accompanying drawings provide a better understanding of the nature and advantages of the present invention.

DETAILED DESCRIPTION

Figure 1:
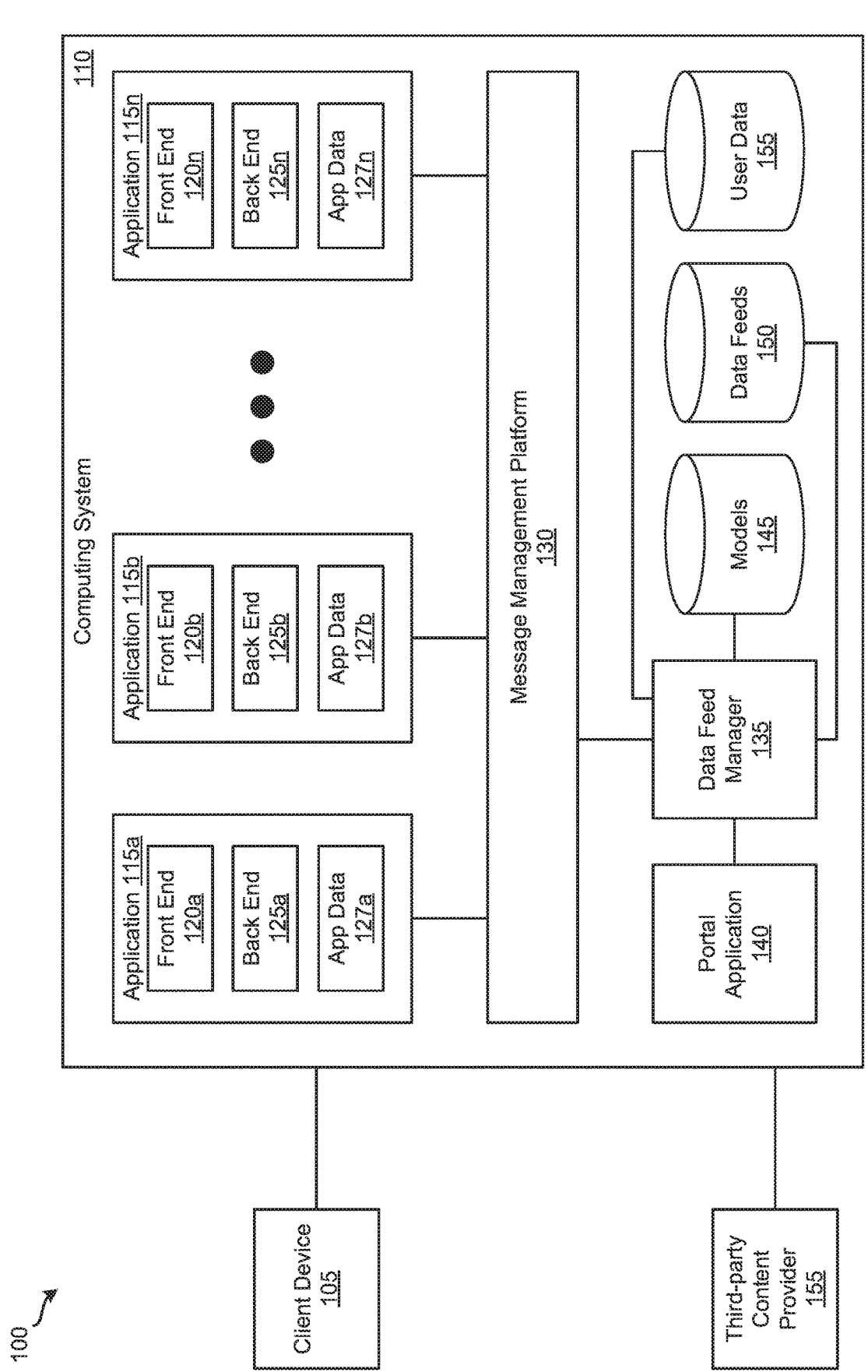
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing data feeds from different applications for users. In some embodiments, several applications are hosted on a computing system. The computing system manages events that occur on the several applications, which the several applications capture in the form of data feed items. Additionally, a portal application hosted on the computing system provides a web portal containing information associated with the several applications. A user of a client device can log into the portal application via an account associated with the user. When the user logs into the portal application, the computing system retrieves data feed items received from the several applications that are relevant to the user and provides them to the client device via the web portal provided by the portal application. In addition, the computing system may retrieve content relevant to the user from a third-party content provider and provide such content to the client device via the web portal.

Also described herein are techniques for processing state changes to applications. When the computing system receives a state change from one of the several applications, the computing system determines a schema that corresponds to the type of state change and uses the schema to generate a data feed item. Different types of state changes have different corresponding schemas. A schema can specifying the information about the state change to include in the data feed item. The computing system may also analyze information from one of the several applications that is relevant to a user in order to derive additional information that would be relevant to the user. The derived additional information can be captured in a data feed item based on a corresponding schema.

The techniques described herein provide a number of benefits and advantages over conventional methods of managing events occurring on applications. First, by using categories (also referred to as commodity categories) to determine relevance, the computing system is able to provide data feed items most relevant to a user. Second, using different factors with different weightings to adjust the relevance of data feed items allows the computing system to adjust the relevance of different types of data feed items differently. Third, by using a web portal that contains information from different applications that are relevant to a user, the computing system can provide a centralized location where the user can view information from multiple applications in a more efficient manner. For example, the user can log into the portal application to view information from different applications instead of having to log into each application separately to view information from each individual application.

FIG. 1 illustrates a system 100 according to some embodiments. System 100 is for managing data feeds from different applications based on categories. In addition, system 100 is for processing state changes to sourcing events. As shown, system 100 includes client device 105, computing system 110 and third-party content provider 155. Client devices 105 is configured to communicate and interact with computing system 110. A user of client device 105 can log into and access each applications 115a-n and perform operations offered by the respective application 115. For instance, an application 115 may be a sourcing application. In some such instances, a user (e.g., a buyer) of client device 105 may log into and access the sourcing application to create sourcing events, modify sourcing events, view sourcing events, etc., via a graphical user interface (GUI) provided by the sourcing application. In some embodiments, a sourcing event may specify a creator of the sourcing event, a set of items to be purchased, a set of quantities for the set of items to be purchased, a set of suppliers, a set of event rules (e.g., a minimum offer adjustment amount (e.g., a defined amount, a defined percentage of the current amount, etc.), a type of offering (e.g., blind bidding, open bidding, auction bidding, etc.) to use for the sourcing event, etc.), a set of timing rules (e.g., a start date and start time at which offers can be made on an item, an end date and end time at which offers can no longer be made on an item, dates and times at which certain suppliers may submit offers, etc.), or any combination thereof. The user may specify the aforementioned attributes for a sourcing event when the user creates the sourcing event. Another user (e.g., a supplier specified in the sourcing event) of another client device (not shown) similar to client device 105 may log into and access the sourcing application to submit offers on items specified in sourcing event via a GUI provided by the sourcing application. In some embodiments, an offer specifies an item in the sourcing event, a price associated with the item, and a quantity associated with the item.

A user of client device 105 can also log into and access portal application 140. Once the user has logged into the user's account associated with portal application 140, client device 105 may access a web portal provided by portal application 140 that contains various information from applications 115a-n that is relevant to the user. In some embodiments, such information includes some or all information that a particular application 115 would have provided client device 105 had the user of client device 105 logged in directly to the particular application 115.

As illustrated in FIG. 1, computing system 110 includes applications 115a-n, message management platform 130, data feed manager 135, portal application 140, and storages 145-155. Models storage 145 is configured to store different classifier models. In some embodiments, a classifier model is configured to classify a particular type of data as being associated with a set of categories and/or a set of geographical regions. For example, a content classifier model can be configured to classify content received from third-party content provider 155 as being associated with a set of categories and/or a set of geographical regions. As another example, a user classifier model may classify a particular user as being associated with a set of categories and/or a set of geographical regions. As yet another example, an entity classifier model can be configured to classify entity data received from applications 115a-n as being associated with a set of categories and/or a set of geographical regions. In another example, a group classifier model may classify multiple users as being associated with the same set of categories and/or the same set of geographical regions. In some embodiments, a classifier model may be implemented using a machine learning model.

Data feeds storage 150 stores data feed items received from applications 115a-n. In some embodiments, a data feed item received from an application 115 includes a relevancy score, a type of data feed item, and a set of recipients. User data storage 155 is configured to store user data associated with different users of applications 115a-n. In some embodiments, user data associated with a user of applications 115a-n can include user profile data (e.g., the user is a buyer for particular products, commodities, etc.; the user is a buyer for particular geographical regions; etc.) and a history of actions performed on applications 115a-n by the user (e.g., the user created a sourcing event using a sourcing application, the user purchased certain items from a particular supplier using a purchasing application, the user paid a supplier using a payment application, etc.)

In some embodiments, storages 145-155 are implemented in a single physical storage while, in other embodiments, storages 145-155 may be implemented across several physical storages. While FIG. 1 shows storages 145-155 as part of computing system 110, one of ordinary skill in the art will understand that storage 145, storage 150, and/or storage 155 may be external to computing system 110 in some embodiments.

Each of the applications 115a-n may be a software application operating on (e.g., hosted on) computing system 110 that may be accessed by client devices 105. An application 115 may be any number of different types of applications. For instance, an application 115 may be an application for sourcing goods and services through a business network, an application for purchasing goods and services through a business network, an application for managing suppliers that are part of a business network, an application for managing spend of goods and services, an application for managing risk, an analytics application, a data management application, a human capital management application, an enterprise management application, a customer relationship management application, a financial management application, etc.

As shown in FIG. 1, each application 115 includes a front end 120, back end 125, and application data storage 127. Application data storage 127 is configured to store application data (e.g., entity data, event logs, etc.) associated with application 115. In some embodiments, application data storage 127 is implemented as a database Front end 120 serves as an interface through which client device 105 interacts with application 115. For instance, front end 120 provides client device 105 with a graphical user interface (GUI) for interacting with application 115. Through such a GUI, front end 120 can receive requests to login to an account associated with the application. Once logged in, front end 120 may receive, via the GUI, commands, instructions, etc. from client device 105. In response to such commands, instructions, etc., front end 120 performs corresponding operations. In addition, front end 125 logs events that occur on application 115 and forwards them to back end 125.

Back end 125 is configured process events that occur on an application 115. For instance, back end 125 may receive from front end 120 a state change associated with data entities stored in application data storage 127. In response, back end 125 updates respective data entities in application data storage 127. Next, back end 125 can generate a message (also referred to as a data feed item) containing information associated with the state change and send the message to message management platform 130. Examples of such information can include a relevancy score, a type of data feed item, and a set of recipients, a set of categories, a set of geographical regions, etc., or any combinations thereof. The information included in a message for a particular type of state change is determined based on a schemed defined for the particular type of state change. As explained above, in some embodiments, a schema can specifying the information about the state change to include in the data feed item. Each application 115 stores (e.g., in application data storage 127) different schemas defined for different types of state changes. Once back end 125 generates the message based on the corresponding schema, back end 125 sends the message to message management platform for processing.

Further, back end 125 generates additional information about data entities stored in application data storage 127 and stores it in application data storage 127. For example, back end 125 can analyze data entities stored in application data storage 127 at defined intervals (e.g., once every fifteen minutes, once every hour, once every day, etc.). Based on the analysis, back end 125 derives additional information about data entities stored in application data storage 127 and stores them in application data storage 127.

Message management platform 130 is responsible for managing data feed items received from applications 115a-n. For example, message management platform 130 can receive a data feed item from an application 115. As mentioned above, in some embodiments, a data feed item received from an application includes a relevancy score, a type of data feed item, and a set of recipients. In some such embodiments, a data feed item also includes a set of categories, a set of geographical regions, or both a set of categories and a set of geographical regions. Upon receiving a data feed item from an application, message management platform 130 sends it to data feed manager 135.

In some embodiments, message management platform may be implemented using a stream-processing platform (e.g., an Apache Kafka platform), a message broker (e.g., an ActiveMQ message broker, a RabbitMQ message broker, a ZeroMQ message broker, etc.), or the like. While FIG. 1 shows message management platform 130 as part of computing system 110, one of ordinary skill in the art will appreciate that message management platform 130 may be external to computing system 110 in some embodiments. For instance, in some such embodiments, message management platform 130 can be implemented using a separate computing system configured to perform the functions described for message management platform 130.

Data feed manager 135 is configured to manage data feed items received from applications 115a-n. For instance, data feed manager 135 can receive a data feed item from an application 115 (e.g., a data feed item about a state change associated with a data entity managed by application 115). The data feed item may include a relevancy score, a type of data feed item, and a set of recipients, a set of categories, a set of geographical regions, etc., or any combinations thereof. Next, data feed manager 135 uses a classifier model (e.g., an entity classifier model) stored in models storage 145 (which is configured to determine a set of categories associated and/or a set of geographical regions based on a data feed item) to determine a set of categories associated with the data feed item and/or a set of geographical regions associated with the data feed item. Then, data feed manager 135 stores the data feed item along with the determined set of categories associated with the data feed item and/or a set of geographical regions associated with the data feed item in data feeds storage 150.

Additionally, data feed manager 135 handles requests for data feed items that are relevant to a user. For example, data feed manager 135 may receive from portal application 140 a request for data feed items that are relevant to a user. In response, data feed manager 135 accesses user data storage 155 to retrieve user data associated with the user. Data feed manager 135 then uses a classifier model (e.g., a user classifier model) stored in models storage 145 (which is configured to determine a set of categories and/or a set of geographical regions based on user data associated with a user) to determine a set of categories associated with the user and/or a set of geographical regions associated with the user. Next, data feed manager 135 queries data feeds storage 150 for data feed items that specify the user as a recipient. Then, data feed manager 135 retrieves data feed items from third-party content provider 155. In some instances, data feed manager 135 sends third-party content provider 155 a request for data feed items associated with the set of categories associated with the user and/or the set of geographical regions associated with the user. In some such instances, third-party content provider 155 provides relevancy scores for the data feed items. In other instances, data feed manager 135 sends third-party content provider 155 a request for data feed items (e.g., a defined number of the most recent data feed items, data feed items from a defined date and/or time range, etc.). Upon receiving data feed items from third-party content provider 155, data feed manager 135 uses a classifier model (e.g., a content classifier model) stored in models storage 145 (which is configured to determine a set of categories and/or a set of geographical regions based on data feed items received from third-party content provider 155) to determine, for each data feed item, a set of categories associated with the user and/or a set of geographical regions associated with the user. Data feed manager 135 then determines a relevancy score for each data feed item based on the determined set of categories associated with the user and/or the determined set of geographical regions, and the determined set of categories associated the data feed item and/or the determined set of geographical regions associated the data feed item.

Data feed manager 135 then modifies the relevancy scores of the data feed items retrieved from data feeds storage 150 and the data feed items retrieved from third-party content provider 155 based on a set of different factors. Examples of such factors include a data feed item type factor (for data feed items received from applications 115, a user data factor (for data feed items retrieved from third-party content provider 155), a time factor, a user group factor, etc. Next, data feed manager 135 generates a result set of data feed items and sends them to portal application 140. The result set of data feed items may include the data feed items retrieved from data feeds storage 150 and the data feed items retrieved from third-party content provider 155 ordered based on the modified relevancy scores from highest relevancy score to lowest relevancy score.

Portal application 140 is configured to a web portal containing information associated with applications 115a-n for different users. For example, portal application 140 can receive a request from client device 105 to log into an account associated with a user of client device 105. In response, portal application 140 sends a request to data feed manager 135 for data feed items relevant to the user. Once portal application 140 receives the data feed items from data feed manager 135, portal application provides them through a web portal provided to client device 105. In this manner, the web portal provided by portal application 140 allows a user of client device 105 to view information associated with applications 115a-n without having to log into applications 115a-n.

Third-party content provider 155 is responsible for providing different content (e.g., articles, blogs, tweets, videos, audio, commodity price updates, etc.) to computing system 110. For example, in some instances, third-party content provider 155 may receive from computing system 110 a request for content associated with a set of categories (e.g., a set of commodity categories). In response, third-party content provider 155 retrieves such content and sends them to computing system 110. Similarly, third-party content provider 155 can receive from computing system 110 a request for content associated with a set of geographical regions (e.g., cities, counties, states, provinces, countries, continents, etc., or combinations thereof). In response, third-party content provider 155 retrieves the requested content and sends them to computing system 110. Third-party content provider 155 may also receive from computing system 110 a request for content associated with a set of categories (e.g., a set of commodity categories) and a set of geographical regions. In response, third-party content provider 155 retrieves such content and sends them to computing system 110. In such instances, each piece of content (also referred to as a data feed item) provided by third-party content provided 155 can include a relevance score determined by third-party content provider 155. What the relevancy score represents depends on the request. For instance, if the request is for data feed items associated with a set of categories, the relevancy score represents the relevance of the data feed items to the set of categories. Similarly, if the request is for data feed items associated with a set of geographical regions, the relevancy score represents the relevance to the set of geographical regions. As another example, if request is for data feed items associated with a set of categories and a set of geographical regions, the relevancy score represents the relevance to the set of categories and the set of geographical regions. In other instances, third-party content provider 155 can receive from computing system 110 a request for content (e.g., a defined number of the most recent content, content from a defined date and/or time range, etc.). In response, third-party content provider 155 sends the requested content to computing system 110.

Figure 2:
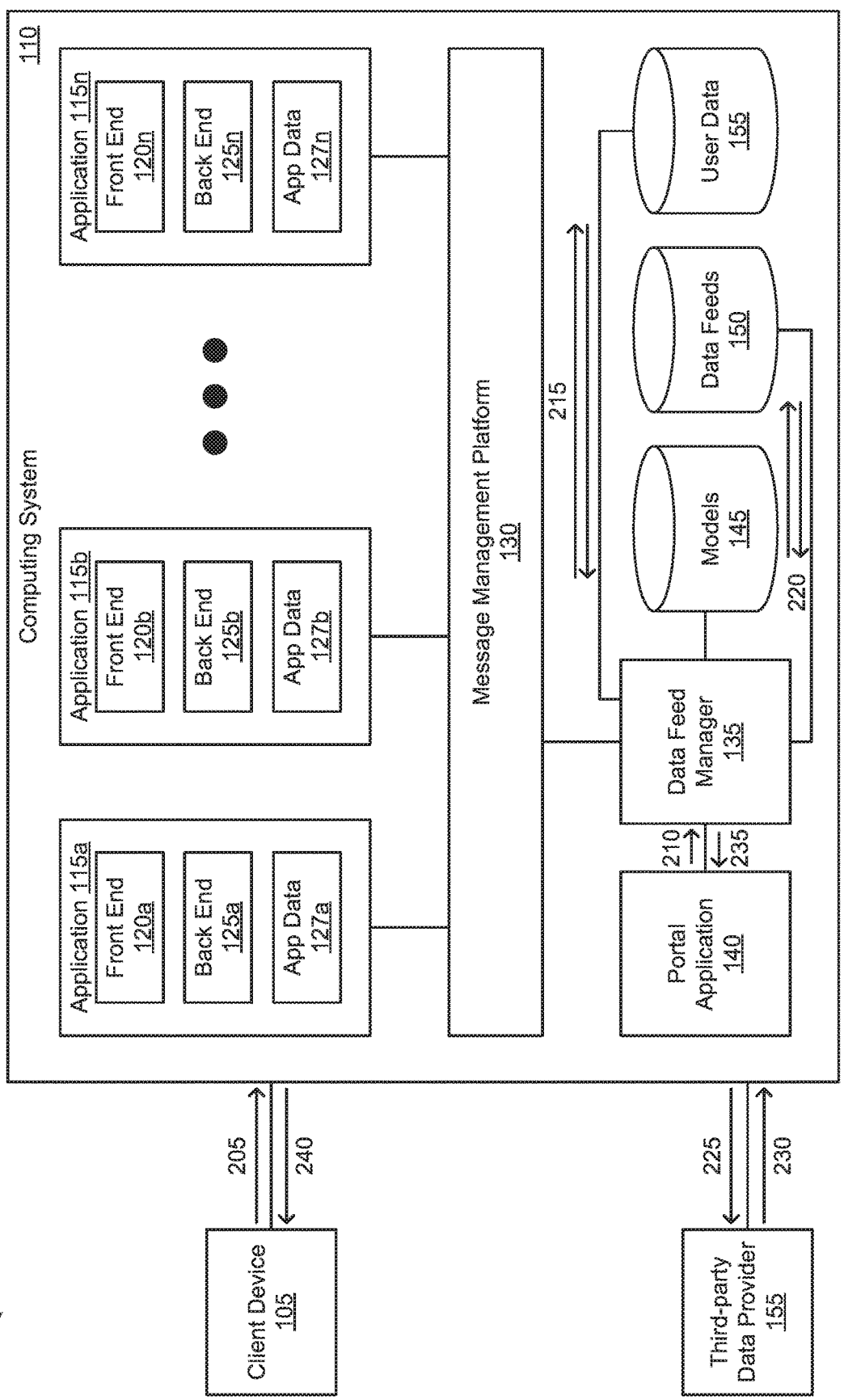
FIG. 2 illustrates a data flow through the system illustrated in FIG. 1 according to some embodiments.

An example operation of system 100 will now be described by reference to FIG. 2, which illustrates a data flow through system 100 according to some embodiments. Specifically, the example operation is determining relevant data feed items for a user. In this example, a user of client device 105 is a buyer in a corporation responsible for procuring steel for the company. As such, user data stored in user data storage 155 includes a user profile that specifies steel as a commodity category. In addition, data feed manager 135 has processed a variety of data feed items received from applications 115a-n—some specifying the user as a recipient and some not specifying by the user as a recipient.

The example operation begins by the user of client device 105 logging, at 205, into the user's account with portal application 140. Once the user is logged into the account, portal application 140 sends, at 210, data feed manager 135 a request for data feed items that are relevant to the user. Next, data feed manager 135 accesses, at 215, user data storage 155 to retrieve user data associated with the user. In this example, the user data includes the user profile associated with the user specifies steel as a commodity category. Then, data feed manager 135 uses a user classifier model stored in models storage 145 to determine, based on the user data associated with the user, a set of categories associated with the user. Data feed manager 135 continues by querying, at 220, data feeds storage 150 for data feed items that specify the user as a recipient. Data feed manager 135 then sends, at 225, third-party content provider 155 a request for data feed items associated with at least one category in the determined set of categories associated with the user. In response to the request, third-party content provider 155 retrieves the requested data feed items, generates a relevancy score for each of the retrieved data feed items, and sends, at 230, the data feed items and with relevancy scores to data feed manager 135.

After receiving the data feed items from third-party content provider 155, data feed manager 135 modifies the relevancy scores of the data feed items retrieved from data feeds storage 150 and the data feed items retrieved from third-party content provider 155 based on a set of factors. As mentioned above, a data feed item received from an application 115 may include a relevancy a type of data feed item. In this example, one type of data feed item is an actionable data feed item (i.e., a user can act on the data feed item) and another type of data feed item is an informational data feed item (i.e., a user does not act on the data feed item). Examples of actionable data feed items may include a data feed item indicating that all the suppliers specified in a sourcing event have submitted bids and the sourcing event is ready to receive a selection of suppliers, a data feed item indicating that an item requested to be purchased is waiting for approval, a data feed item indicating that an proposal is waiting for review, a data feed item indicating that a quote is waiting for review, etc. Examples of informational data feed item (also referred to as unactionable data feed items) include a data feed item indicating that a supplier has submitted an offer for items in a sourcing event, a data feed item indicating that a supplier has modified an offer for items in a sourcing event, a data feed item indicating that a supplier has signed a contract, etc.

In this example, applications 115 have determined the relevancy scores of actionable data feed items to be higher than the relevancy scores of unactionable data feed items. In addition, for this example, date feed manager 135 determines that data feed items are ranked as the following from highest to lowest: (1) actionable data feed items, (2) data feet items from third-party content provider 155 that are associated with the determined set of categories associated with the user; and (3) unactionable data feed items. Accordingly, data feed manger 135 uses different weights accordingly to modify the relevancy scores of the data feed items such that the relevancy scores of actionable data feed items are increased the greatest amount, the relevancy scores of data feet items from third-party content provider 155 that are associated with the determined set of categories associated with the user are increased second greatest amount; and the relevancy scores of unactionable data feed items are increased third greatest amount. Data feed manager 135 may further modify the relevancy scores of the data feed items based on a time factor in which more recent data feed items (e.g., based on a timestamp of the data feed item) are increased a greater amount then less recent data feed items.

Continuing with the example operation, data feed manager 135 generates a result set of data feed items and sends, at 235, them to portal application 140. In this example, the result set of data feed items includes the data feed items retrieved from data feeds storage 150 and the data feed items retrieved from third-party content provider 155 ordered based on the modified relevancy scores from highest relevancy score to lowest relevancy score. Finally, portal application 140 provides, at 240, the result set of data feed items to client device 105 via a web portal.

Figure 3:
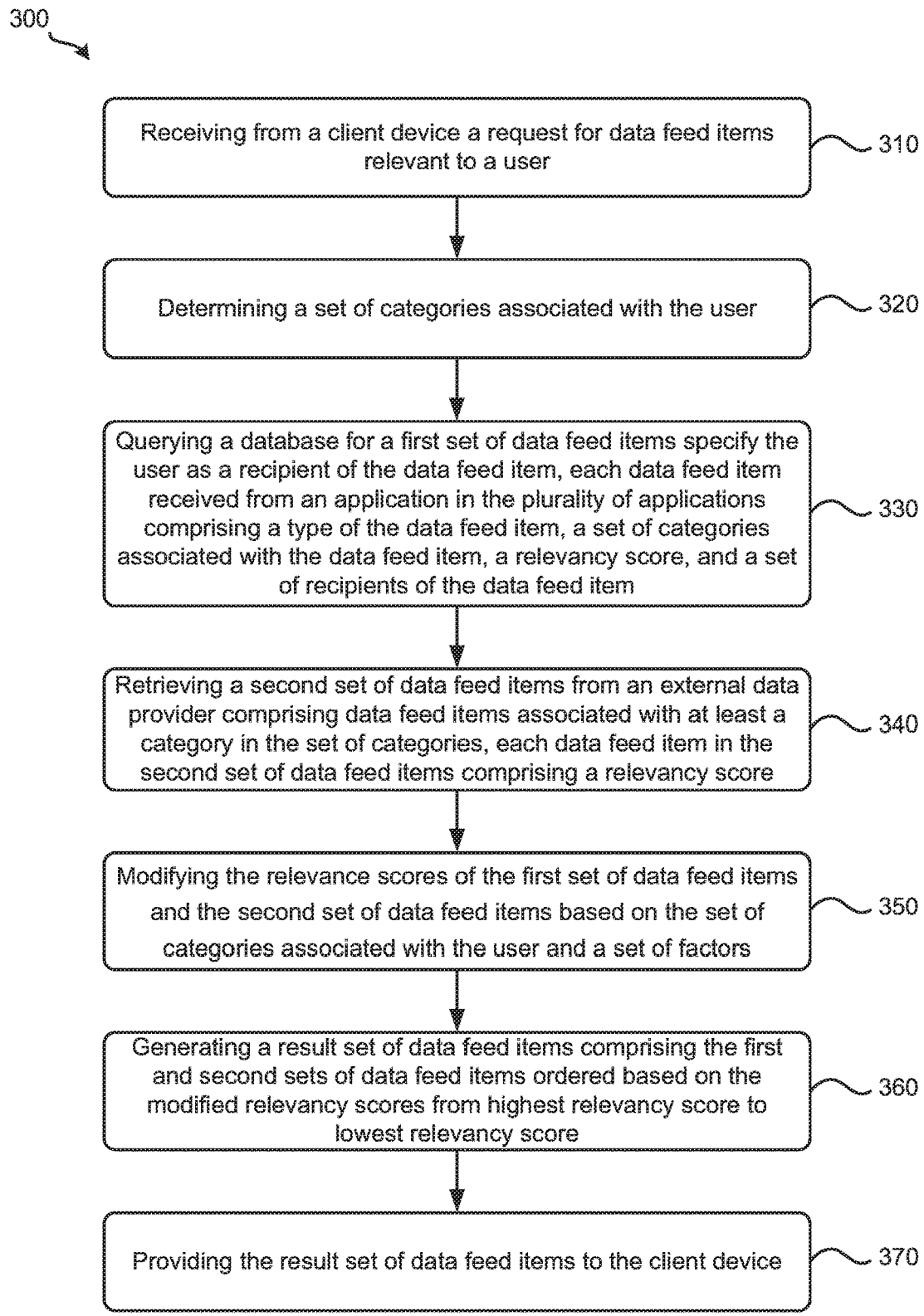
FIG. 3 illustrates a process for determining relevant data feed items for a user according to some embodiments.

FIG. 3 illustrates a process 300 for determining relevant data feed items for a user according to some embodiments. In some embodiments, computing system 110 performs process 300. Process 300 starts by receiving, at 310, from a client device a request for data feed items relevant to a user. Referring to FIG. 1 as an example, portal application 140 may receive the request from a user of client device 105. In response, portal application 140 sends data feed manager 135 a request for data feed items relevant to the user.

Next, process 300 determines, at 320, a set of categories associated with the user. Referring to FIG. 1 as an example, data feed manager 135 accesses user data storage 155 to retrieve user data associated with the user and then uses a user classifier model stored in models storage 145 to determine, based on the user data associated with the user, a set of categories associated with the user. Process 300 then queries, at 330, a database for a first set of data feed items specify the user as a recipient of the data feed item. Each data feed item includes a type of the data feed item, a set of categories associated with the data feed item, a relevancy score, and a set of recipients of the data feed item. Referring to FIG. 1 as an example, data feed manager 135 queries data feeds storage 150 for data feed items that specify the user as a recipient.

At 340, process 300 retrieves a second set of data feed items from an external content provider that includes data feed items associated with at least a category in the set of categories, each data feed item in the second set of data feed items comprising a relevancy score. Data feed manager 135 then sends, at 225, third-party content provider 155 a request for data feed items associated with at least one category in the determined set of categories associated with the user. In response, third-party content provider 155 retrieves the requested data feed items, generates a relevancy score for each of the retrieved data feed items, and sends the data feed items and with relevancy scores to data feed manager 135.

Process 300 then modifies, at 350, the relevance scores of the first set of data feed items and the second set of data feed items based on the set of categories associated with the user and a set of factors. Referring to FIG. 1 as an example, data feed manager 135 may modify the relevancy scores of the data feed items in the same or similar manner as that described above in the example operation. Next, process 300 generates, at 360, a result set of data feed items that includes the first and second sets of data feed items ordered based on the modified relevancy scores from highest relevancy score to lowest relevancy score. Referring to FIG. 1 as an example, data feed manager 135 generates the result set of data feed items. Finally, process 300 provides, at 370, the result set of data feed items to the client device. Referring to FIG. 1 as an example, data feed manager 135 sends the result set of data feed items to portal application 140, which provides them to client device 105 via a web portal.

Figure 4:
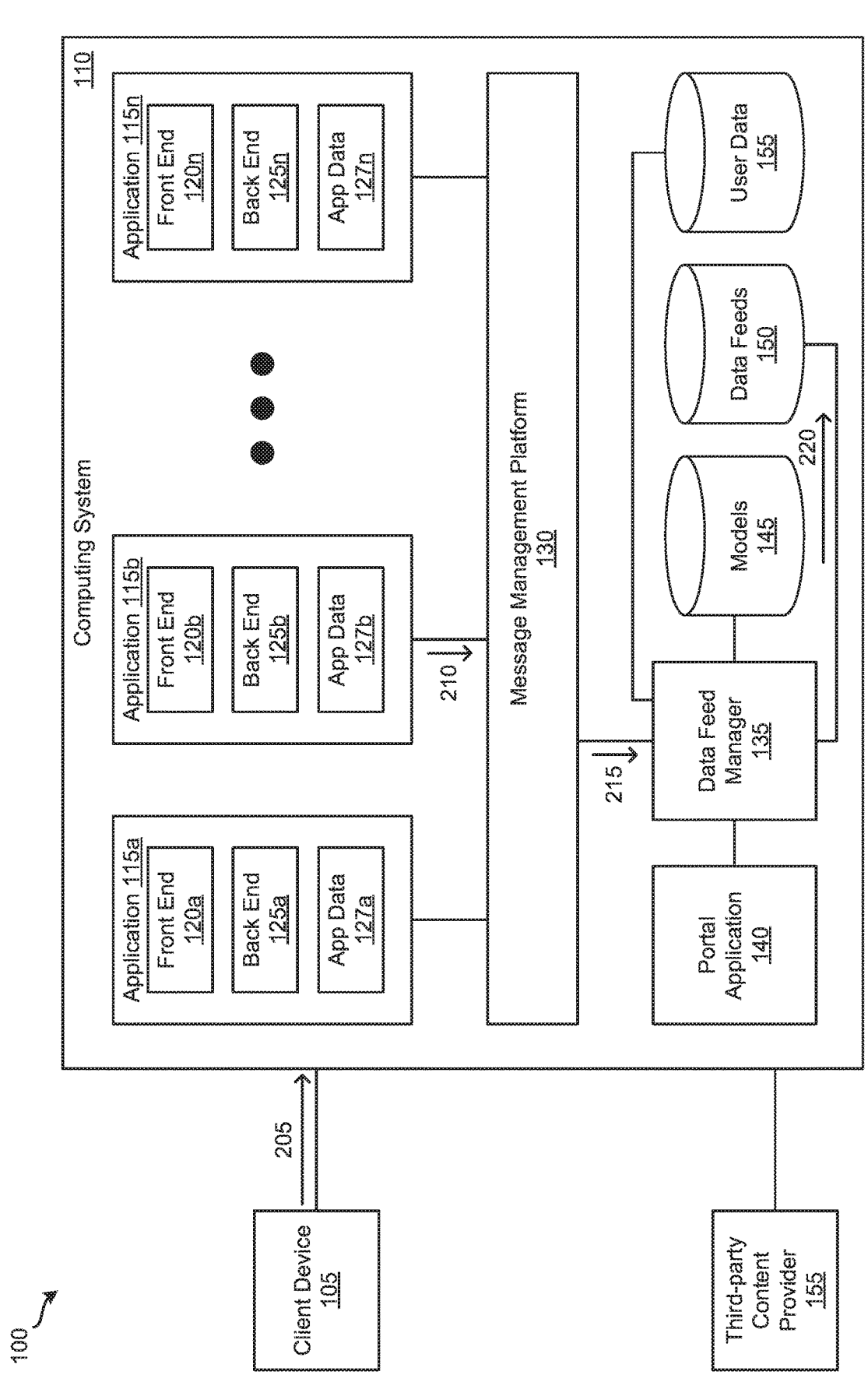
FIG. 4 illustrates another data flow through the system illustrated in FIG. 1 according to some embodiments.

Another example operation of system 100 will now be described by reference to FIG. 4, which illustrates a data flow through system 100 according to some embodiments. In particular, the example operation is processing a state change to a sourcing event. For this example, a user of client device has already created a sourcing event by logging into application 125b, which in this example is a sourcing application, to create the sourcing event. The sourcing event specifies the user as the creator of the sourcing event, a set of items to be purchased, a set of quantities for the set of items to be purchased, a set of suppliers. The example operation starts by a user of client device 105 logging, at 205, into the user's account with application 115, which in this example is a sourcing application. Next, the user of client device 105 selects, via a GUI provided by front end 120b, the sourcing event and performs a modification to the sourcing event. For this example, the user of client device 105 modified the sourcing event by adding items to be purchased to the sourcing event.

Next, front end 120b sends back end 125b the modification to the sourcing event and a notification indicating a state change of "sourcing event updated". In response, back end 125 updates the sourcing event stored in application data storage 127b. As mentioned above, a schema can specifying the information about a state change to include in a data feed item. Also, different schemas can be defined for different types of state changes. In this example, back end 125b identifies a schema definition from the different schema definitions stored in application data storage 127b that is defined for a "sourcing event updated" state change. For this example, the identified schema definition specifies to include a notification indicating that a sourcing event has been modified by the creator and the modification. As such, back end 125b queries application data storage 127b for the information specified in the schema definition and then generates a message (i.e., a data feed item) containing the notification specified in the schema, a relevancy score for the data feed item, and the set of suppliers specified in the sourcing event as the recipients of the data feed item. Since the state change in this example is an informational data feed item, back end 125b generates a relevancy score that is lower than that generated for an actionable data feed item. Back end 125b then sends, at 210, the data feed item to message management platform 130, which forwards, at 215, it to data feed manage 135. Upon receiving the data feed item, data feed manager 135 processes it by using an entity classifier model stored in models storage 145 to determine a set of categories associated with the data feed item and storing, at 220, the data feed item along with the determined set of categories associated with the data feed item in data feeds storage 150. When a supplier specified in the sourcing event uses a client device similar to client device 105 to log into portal application 140, a web portal provided by portal application 140 will include a data feed item with a notification indicating that the sourcing event has been modified by the creator and items have been added to the sourcing event.

Figure 5:
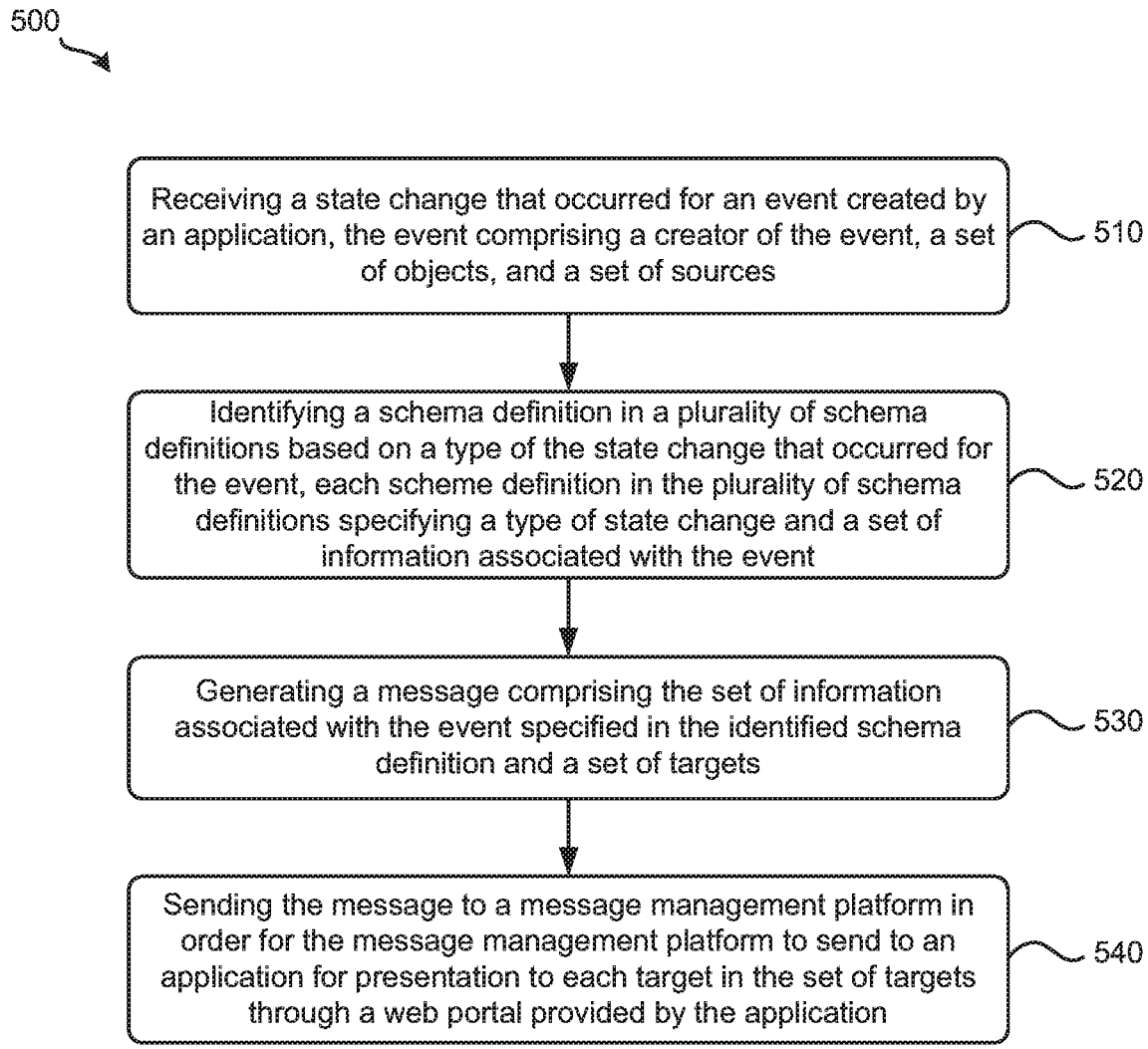
FIG. 5 illustrates a process for processing a state change to a sourcing event according to some embodiments.

FIG. 5 illustrates a process 500 for processing a state change to a sourcing event according to some embodiments. In some embodiments, computing system 110 performs process 500. Process 500 begins by receiving, at 510, a state change that occurred for a sourcing event created by an application. The sourcing event includes a creator of the sourcing event, a set of items, a set of quantities for the set of items, and a set of suppliers. Referring to FIGS. 1 and 4 as an example, front end 120b of application 115b may receive the state change that occurred for the sourcing event created by application 115b. Front end 120b then sends back end 125b the modification to the sourcing event and a notification indicating a state change of "sourcing event updated". In response, back end 125 updates the sourcing event stored in application data storage 127b.

Next, process 500 identifies, at 520, a schema definition in a plurality of schema definitions based on a type of the state change that occurred for the sourcing event. Each scheme definition in the plurality of schema definitions specifies a type of state change and a set of information associated with the sourcing event. Referring to FIGS. 1 and 4 as an example, back end 125b identifies a schema definition from the different schema definitions stored in application data storage 127b that is defined for a "sourcing event updated" state change. The identified schema definition in this example specifies to include a notification indicating that a sourcing event has been modified by the creator and the modification.

Process 500 then generates, at 530, a message that includes the set of information associated with the sourcing event specified in the identified schema definition and a set of recipients. Referring to FIGS. 1 and 4 as an example, back end 125b generates the message by querying application data storage 127b for the information specified in the schema definition and including in the message the notification specified in the schema, a relevancy score for the data feed item, and the set of suppliers specified in the sourcing event as the recipients of the data feed item.

Finally, process 500 sends, at 540, the message to a message management platform in order for the message management platform to send to an application for presentation to each recipient in the set of recipients through a web portal provided by the application. Referring to FIGS. 1 and 4 as an example, back end 125b sends the data feed item to message management platform 130, which forwards the date feed item to data feed manage 135. Data feed manager 135 processes it by using an entity classifier model stored in models storage 145 to determine a set of categories associated with the data feed item and storing, at 220, the data feed item along with the determined set of categories associated with the data feed item in data feeds storage 150. When a supplier specified in the sourcing event uses a client device similar to client device 105 to log into portal application 140, a web portal provided by portal application 140 will include a data feed item with a notification indicating that the sourcing event has been modified by the creator and items have been added to the sourcing event.

The examples and embodiments described above by reference to FIGS. 1-5 demonstrate determining the relevance of data feed items for users based on commodities categories. One of ordinary skill in the art will realized that the same or similar techniques may be used to determine the relevance of data feed items for users based additional and/or different criteria. For instance, the relevance of data feed items for users can be determined based on geographical regions. As another example, the relevance of data feed items for users can be determined based on commodity categories and geographical regions.

Figure 6:
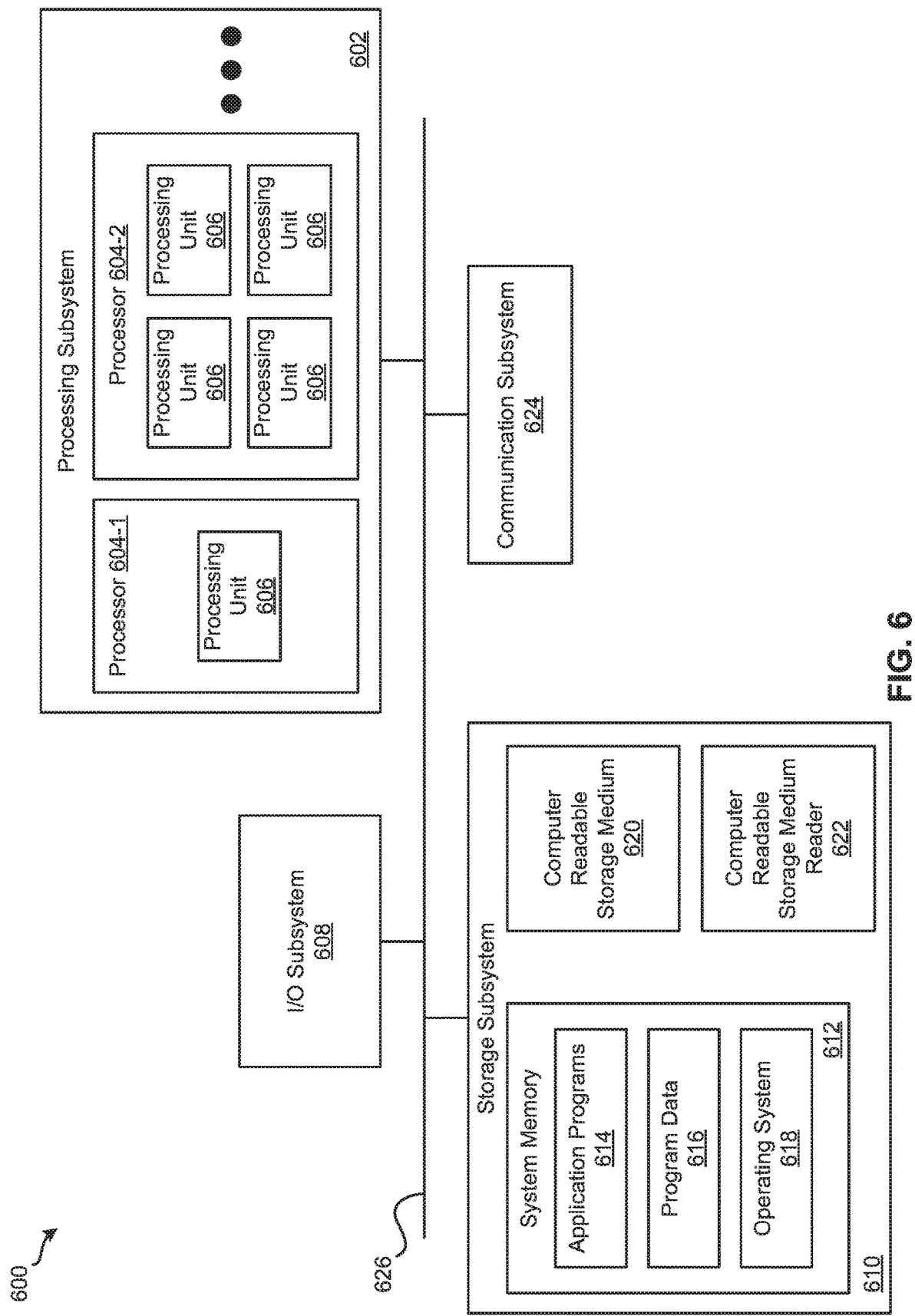
FIG. 6 illustrates an exemplary computer system, in which various embodiments may be implemented.

FIG. 6 illustrates an exemplary computer system 600 for implementing various embodiments described above. For example, computer system 600 may be used to implement client device 105, computing system 110, and third-party content provider 155. Computer system 600 may be a desktop computer, a laptop, a server computer, or any other type of computer system or combination thereof. Some or all elements of applications 115a-n, message management platform 130, data feed manager 135, portal application 140, or combinations thereof can be included or implemented in computer system 1000. In addition, computer system 1000 can implement many of the operations, methods, and/or processes described above (e.g., process 300 and process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 300, process 500, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., applications 115*a*-*n* and portal application 140), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., applications 115*a*-*n*, message management platform 130, data feed manager 135, and portal application 140) and/or processes (e.g., process 300 and process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
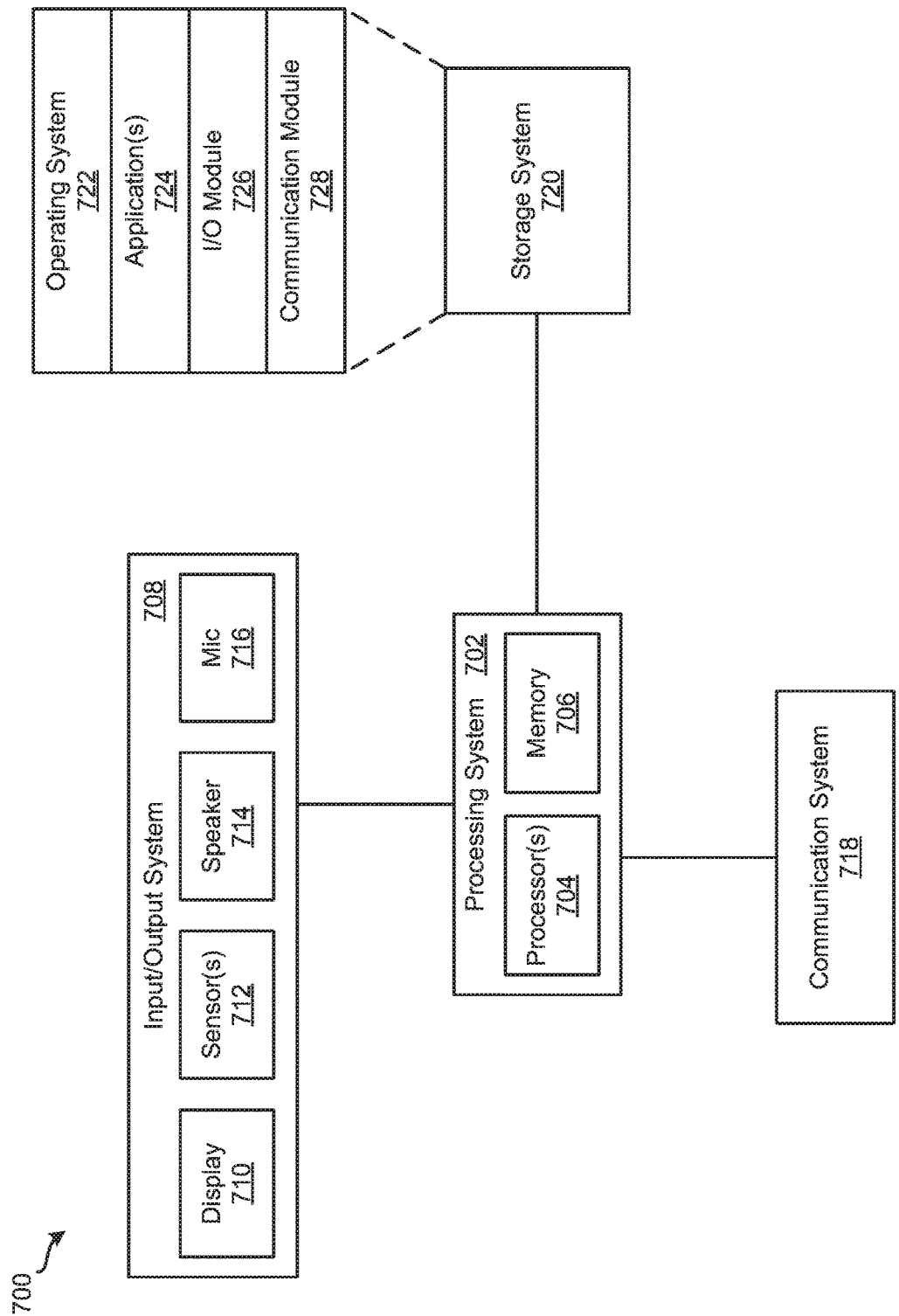
FIG. 7 illustrates an exemplary computing device, in which various embodiments may be implemented.

FIG. 7 illustrates an exemplary computing device 700 for implementing various embodiments described above. For example, computing device 700 may be used to implement mobile device 105. Computing device 700 may be a cellphone, a smartphone, a wearable device, an activity tracker or manager, a tablet, a personal digital assistant (PDA), a media player, or any other type of mobile computing device or combination thereof. As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software. Many of the components and/or processes described above may be implemented as software that when executed by a processor or processing unit (e.g., processors 704 of processing system 702) performs the operations of such components and/or processes.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
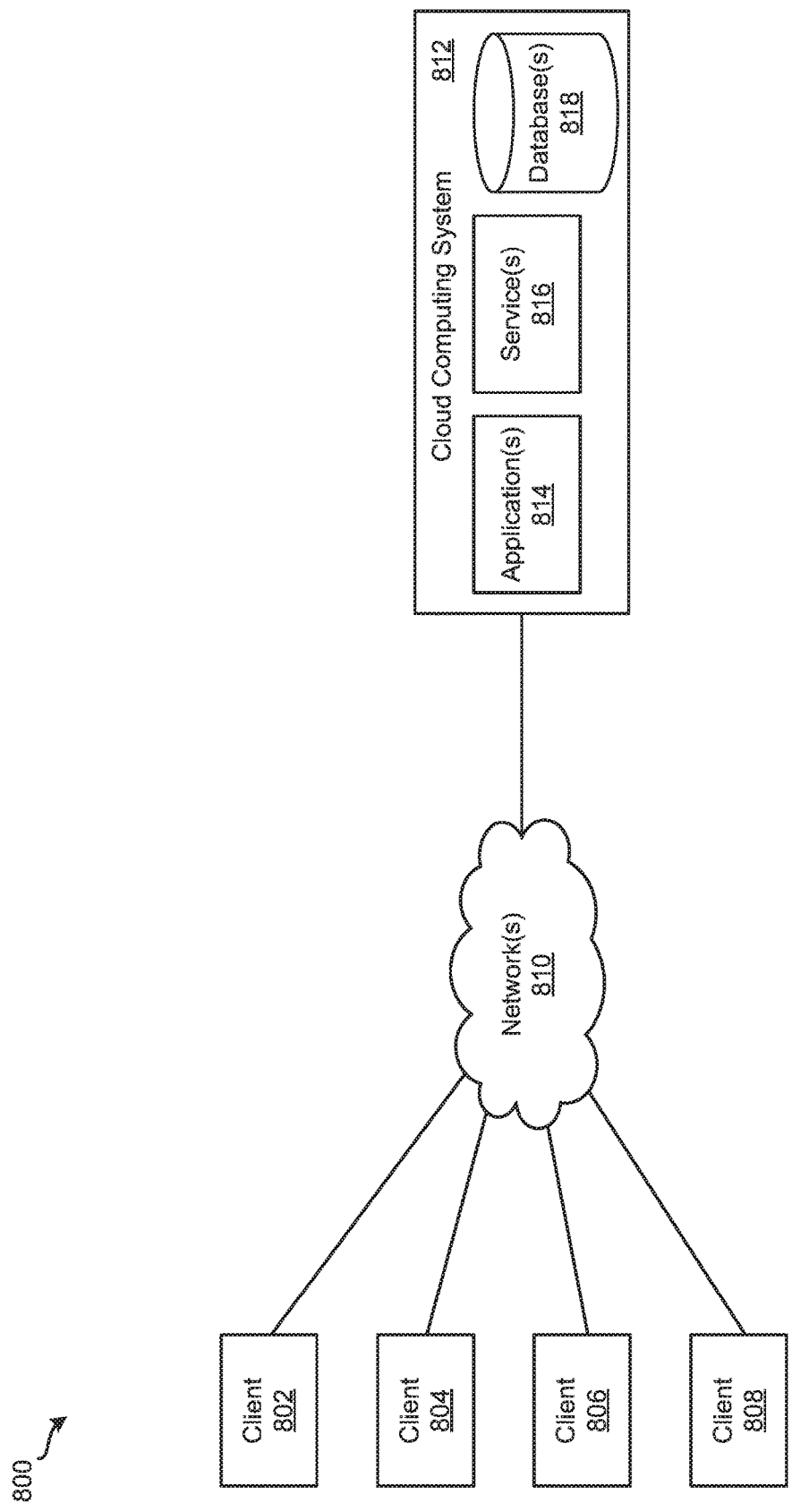
FIG. 8 illustrates an exemplary system, in which various embodiments may be implemented.

FIG. 8 illustrates an exemplary system 800 for implementing various embodiments described above. For example, cloud computing system 812 may be used to implement computing system 110 and one of client devices 802-808 may be used to implement client device 105. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 800 is referred to as a "cloud service." Typically, servers and systems that make up cloud computing system 800 are different from the on-premises servers and systems of a customer. For example, cloud computing system 800 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storages 145-155 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving from a client device a request for data feed items relevant to a user;
   determining a set of categories associated with the user;
   querying a database for a first set of data feed items specify the user as a recipient of the data feed item, the database configured to store data feed items received from a plurality of applications, each data feed item received from an application in the plurality of applications comprising a type of the data feed item, a set of categories associated with the data feed item, a relevancy score, and a set of recipients of the data feed item;
   retrieving a second set of data feed items from an external content provider comprising data feed items associated with at least a category in the set of categories, each data feed item in the second set of data feed items comprising a relevancy score;
   modifying the relevancy scores of the first set of data feed items and the second set of data feed items based on the set of categories associated with the user and a set of factors, the modifying further comprising increasing the relevancy scores of data feed items in the second set of data feed items associated with at least a category in the set of categories associated with the user;
   generating a result set of data feed items comprising the first and second sets of data feed items ordered based on the modified relevancy scores from highest relevancy score to lowest relevancy score; and
   providing the result set of data feed items to the client device.

2. The non-transitory machine-readable medium of claim 1, wherein modifying the relevance scores of the first set of data feed items and the second set of data feed items based on the set of categories associated with the user and a set of factors comprises increasing the relevancy scores of data feed items in the first set of data feed items having a particular type of data feed item and maintaining the relevancy scores of data feed items in the first set of data feed items having a type of data feed item other than the particular type of data feed item.

3. The non-transitory machine-readable medium of claim 1, wherein the second set of data feed items from the external content provider further comprises data feed items associated with categories other than the set of categories, wherein modifying the relevancy scores of the first set of data feed items and the second set of data feed items based on the set of categories associated with the user and a set of factors further comprises maintaining the relevancy scores of data feed items in the second set of data feed items associated categories other than the set of categories.

4. The non-transitory machine-readable medium of claim 1, wherein each data feed item in the first and second sets of data feed items comprises a timestamp, wherein modifying the relevance scores of the first set of data feed items and the second set of data feed items based on the set of categories associated with the user and a set of factors comprises increasing the relevancy scores of data feed items in the first and second sets of set of data feed items having a more recent timestamp by a larger amount than data feed items in the first and second sets of set of data feed items having a less recent timestamp.

5. The non-transitory machine-readable medium of claim 1, wherein modifying the relevance scores of the first set of data feed items and the second set of data feed items based on the set of categories associated with the user and a set of factors comprises increasing the relevancy scores of data feed items in the first and second sets of set of data feed items that have not been viewed the user.

6. The non-transitory machine-readable medium of claim 1, wherein retrieving the second set of data feed items from the external content provider comprises:
   sending the external content provider a request for data feed items;
   receiving the second set of data feed items from the external content provider; and
   for each data feed item in the second set of data feed items, using a classifier model to determine a set of categories associated with the data feed item and to determine the relevancy score of the data feed item based on the determined set of categories associated with the user and the determined set of categories associated the data feed item.

7. The non-transitory machine-readable medium of claim 1, wherein determining the set of categories associated with the user comprises using a classifier model configured to determine sets of categories for users in order to determine the set of categories associated with the user.

8. A method, executable by a device, comprising:
   receiving from a client device a request for data feed items relevant to a user;
   determining a set of categories associated with the user;
   querying a database for a first set of data feed items specify the user as a recipient of the data feed item, the database configured to store data feed items received from a plurality of applications, each data feed item received from an application in the plurality of applications comprising a type of the data feed item, a set of categories associated with the data feed item, a relevancy score, and a set of recipients of the data feed item;

retrieving a second set of data feed items from an external content provider comprising data feed items associated with at least a category in the set of categories, each data feed item in the second set of data feed items comprising a relevancy score;

modifying the relevancy scores of the first set of data feed items and the second set of data feed items based on the set of categories associated with the user and a set of factors, the modifying further comprising increasing the relevancy scores of data feed items in the second set of data feed items associated with at least a category in the set of categories associated with the user;

generating a result set of data feed items comprising the first and second sets of data feed items ordered based on the modified relevancy scores from highest relevancy score to lowest relevancy score; and providing the result set of data feed items to the client device.

9. The method of claim 8, wherein modifying the relevance scores of the first set of data feed items and the second set of data feed items based on the set of categories associated with the user and a set of factors comprises increasing the relevancy scores of data feed items in the first set of data feed items having a particular type of data feed item and maintaining the relevancy scores of data feed items in the first set of data feed items having a type of data feed item other than the particular type of data feed item.

10. The method of claim 8, wherein the second set of data feed items from the external content provider further comprises data feed items associated with categories other than the set of categories, wherein modifying the relevancy scores of the first set of data feed items and the second set of data feed items based on the set of categories associated with the user and a set of factors further comprises maintaining the relevancy scores of data feed items in the second set of data feed items associated categories other than the set of categories.

11. The method of claim 8, wherein each data feed item in the first and second sets of data feed items comprises a timestamp, wherein modifying the relevance scores of the first set of data feed items and the second set of data feed items based on the set of categories associated with the user and a set of factors comprises increasing the relevancy scores of data feed items in the first and second sets of set of data feed items having a more recent timestamp by a larger amount than data feed items in the first and second sets of set of data feed items having a less recent timestamp.

12. The method of claim 8, wherein modifying the relevance scores of the first set of data feed items and the second set of data feed items based on the set of categories associated with the user and a set of factors comprises increasing the relevancy scores of data feed items in the first and second sets of set of data feed items that have not been viewed the user.

13. The method of claim 8, wherein retrieving the second set of data feed items from the external content provider comprises:

sending the external content provider a request for data feed items;

receiving the second set of data feed items from the external content provider; and for each data feed item in the second set of data feed items, using a classifier model to determine a set of categories associated with the data feed item and to determine the relevancy score of the data feed item based on the determined set of categories associated with the user and the determined set of categories associated the data feed item.

14. The method of claim 8, wherein determining the set of categories associated with the user comprises using a classifier model configured to determine sets of categories for users in order to determine the set of categories associated with the user.

15. A system comprising:

a set of processing units; and a non-transitory machine-readable medium storing instructions that when executed by at least one processing unit in the set of processing units cause the at least one processing unit to:

receive from a client device a request for data feed items relevant to a user;

determine a set of categories associated with the user;

query a database for a first set of data feed items specify the user as a recipient of the data feed item, the database configured to store data feed items received from a plurality of applications, each data feed item received from an application in the plurality of applications comprising a type of the data feed item, a set of categories associated with the data feed item, a relevancy score, and a set of recipients of the data feed item;

retrieve a second set of data feed items from an external content provider comprising data feed items associated with at least a category in the set of categories, each data feed item in the second set of data feed items comprising a relevancy score;

modify the relevancy scores of the first set of data feed items and the second set of data feed items based on the set of categories associated with the user and a set of factors, the modifying further comprising increasing the relevancy scores of data feed items in the second set of data feed items associated with at least a category in the set of categories associated with the user;

generate a result set of data feed items comprising the first and second sets of data feed items ordered based on the modified relevancy scores from highest relevancy score to lowest relevancy score; and provide the result set of data feed items to the client device.

16. The system of claim 15, wherein modifying the relevance scores of the first set of data feed items and the second set of data feed items based on the set of categories associated with the user and a set of factors comprises increasing the relevancy scores of data feed items in the first set of data feed items having a particular type of data feed item and maintaining the relevancy scores of data feed items in the first set of data feed items having a type of data feed item other than the particular type of data feed item.

17. The system of claim 15, wherein the second set of data feed items from the external content provider further comprises data feed items associated with categories other than the set of categories, wherein modifying the relevancy scores of the first set of data feed items and the second set of data feed items based on the set of categories associated with the user and a set of factors further comprises maintaining the relevancy scores of data feed items in the second set of data feed items associated categories other than the set of categories.

18. The system of claim 15, wherein each data feed item in the first and second sets of data feed items comprises a timestamp, wherein modifying the relevance scores of the first set of data feed items and the second set of data feed items based on the set of categories associated with the user and a set of factors comprises increasing the relevancy scores of data feed items in the first and second sets of set of data feed items having a more recent timestamp by a larger amount than data feed items in the first and second sets of set of data feed items having a less recent timestamp.

19. The system of claim 15, wherein modifying the relevance scores of the first set of data feed items and the second set of data feed items based on the set of categories associated with the user and a set of factors comprises increasing the relevancy scores of data feed items in the first and second sets of set of data feed items that have not been viewed the user.

20. The system of claim 15, wherein retrieving the second set of data feed items from the external content provider comprises:

sending the external content provider a request for data feed items;

receiving the second set of data feed items from the external content provider; and for each data feed item in the second set of data feed items, using a classifier model to determine a set of categories associated with the data feed item and to determine the relevancy score of the data feed item based on the determined set of categories associated with the user and the determined set of categories associated the data feed item.

\* \* \* \* \*